July 16, 1929.   D. M. AUVIL   1,721,199
SAW SUPPORTING DEVICE
Filed Nov. 1, 1926
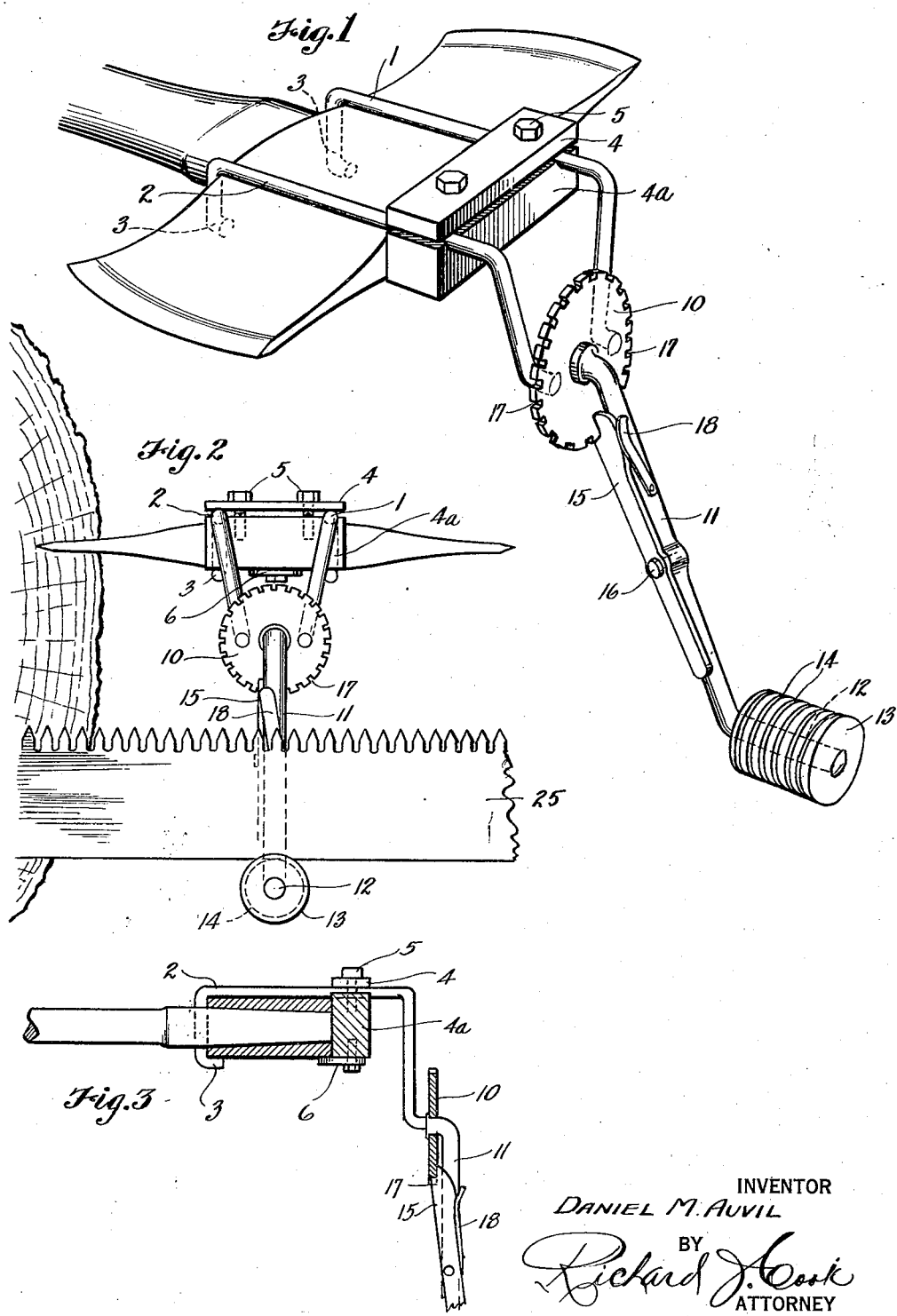
INVENTOR
DANIEL M. AUVIL
BY
Richard J. Cook
ATTORNEY Patented July 16, 1929.

1,721,199

UNITED STATES PATENT OFFICE.

DANIEL M. AUVIL, OF RYDERWOOD, WASHINGTON.

SAW-SUPPORTING DEVICE.

Application filed November 1, 1926. Serial No. 145,582.

This invention relates to improvements in saw supporting devices and more particularly to a device of a character designed for supporting a saw for undercutting a log; the principal object of the invention being to provide a saw support that may be used as an attachment for an axe head after the latter has been sunk into a log and which is easily adjustable and will serve satisfactory as a guide and support for a saw used for undercutting the log.

More specifically, the object of the invention resides in the provision of a device of the above character comprising attaching members which are adapted to grip the axe head, an arm that is adjustably fixed to the members and equipped with a guide roller on which a saw may be supported in operative position.

Other objects of the invention reside in the various details of construction and combination of parts as is hereinafter described which provide for attaching the device to axes of different size and for adjustment of the arm to different positions.

In accomplishing these and other objects of the invention, I have provided the improved details of construction, the preferred forms of which are illustrated in the accompanying drawings, wherein—

Figure 1 is a perspective view of a saw supporting device constructed in accordance with the present invention, showing it as functionally applied to an axe head.

Figure 2 is an end view of the device illustrating its use.

Figure 3 is a sectional detail of the same.

Referring more in detail to the drawings—

The present device is used as an attachment for an axe and in use is applied to the axe head after the latter has been sunk into the log which is to be undercut; the log being in horizontal position, the axe head is stuck into it so that the handle of the axe will extend horizontally and parallel with the side of the log.

In its preferred construction, the attachment device comprises a pair of attaching bars 1 and 2 that are adapted to overlie the upper flat side of the axe head after the latter has been sunk into the log. These bars have downturned inner ends forming hooks 3 which are hooked over the inner edge of the axe head at opposite sides of its handle, and slidably adjustable along the outer portions of the bars, is a clamping block comprising upper and lower parts 4 and 4ᵃ between which the bars extend. After the hooked ends of the bars 1 and 2 are hooked about the inner edge of the head, the block is adjusted against its outer edge and is locked in this position by tightening set screws 5 which clamp the two parts of the block against the bars so that the latter cannot slip and unseat the hooks. Pivotally mounted on the underside of the clamping block, is a plate or button 6 that may be turned so as to project beneath the underside of the axe head, to thereby prevent the block from slipping upwardly.

At the outside of the block, the bars 1 and 2 are turned downwardly and drawn toward each other and are fixed rigidly to a circular, vertically disposed disc 10 and, pivoted centrally to the disc, is a depending arm or bracket 11 which, at its lower end, has a laterally turned shank 12 on which a saw supporting roller 13 is revolubly mounted; the roller being provided with a plurality of annular grooves 14 which serve as guides in which the back edge of a saw, as designated at 25, may operate. The arm 11 is adjustable to different positions radially of the disc in order that the roller may support the saw in the different positions required as it cuts upwardly through the log and it is adapted to be held at different positions of adjustment by means of a locking lever 15 that is attached by a pivot pin 16 to the arm with one end adapted to seat within notches 17 formed in the periphery of the disc. A spring 18 is mounted on the arm and bears against one end of the locking bar to normally retain it seated against the disk, but it may be disengaged from the disc, when it is desired to adjust the arm to a different position, by pressing inwardly on its other end.

Assuming the device to be so constructed, it is used in the following manner: First, the axe head is stuck into the log, as is shown in Figure 2; then the hooked ends 3 of the bars 1 and 2 are applied to the inner edge of the head at opposite sides of the handle and the clamping block is adjusted against the outer edge of the head and is locked there by tightening the set screws 5 and by turning the plate 6 to project beneath the edge of the head. The saw supporting arm 11 is then adjusted to a position that will give a proper elevation for the supporting roller and the saw is placed for travel on the roller as indicated in Figure 2.

It is apparent that the saw may then be manipulated to undercut the log and as it advances upwardly into the log, the arm may be readjusted so that the roller will be in position to serve as a support until the limit of the arm has been reached and then, if necessary, the axe may be reset.

Having thus described my invention, what I claim as new therein and desire to secure by Letters Patent, is:

1. A device of the character described comprising a pair of attaching bars having hooked ends adapted to be applied to a supporting member, a locking block adjustable on the bars against the support in opposed relation to the hooks, a notched disk supported by the bars, an arm pivotally supported by the disk to swing radially thereof, means for locking the arm at different positions of adjustment and a saw guiding and supporting roller mounted on the arm.

2. A device of the character described comprising a pair of attaching bars adapted to lie flatly against the face of an axe and having hooked ends adapted to hook over one edge of the axe, a locking block adjustable on the bars against the other edge of the axe head, a locking plate on the block adapted to be adjusted in holding relation with the axe to prevent movement of the locking block relative thereto, a disk fixed to said bars, having peripheral notches, an arm pivotally mounted at one end in the disk to swing radially thereof, a saw supporting and guide roller mounted at the end of the arm and a spring pressed lock lever on the arm adapted to seat in notches of the disk to hold the arm at different positions of adjustment.

Signed at Ryderwood, Wash., this 17th day of September, 1926.

DANIEL M. AUVIL.